Figure 1:
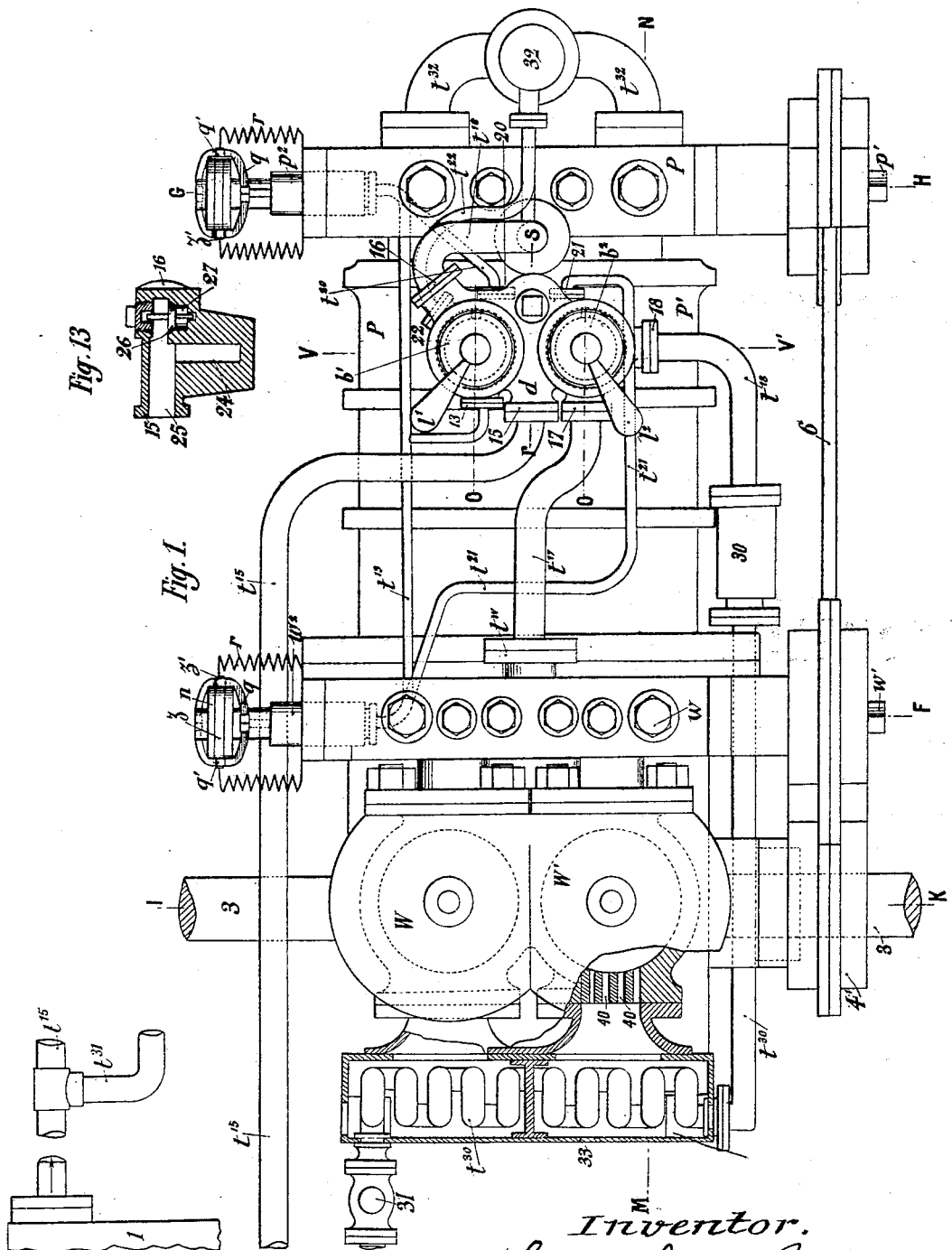

No. 625,416. Patented May 23, 1899.
L. L. REVEL.
CARBURETED AIR OR OTHER FLUID PRESSURE ENGINE.
(Application filed Aug. 18, 1898.)
(No Model.) 9 Sheets—Sheet 3.

Witnesses:
Inventor:
Lievin Louis Revel
By Richardson
his Attorneys

No. 625,416. Patented May 23, 1899.
L. L. REVEL.
CARBURETED AIR OR OTHER FLUID PRESSURE ENGINE.
(Application filed Aug. 18, 1898.)
(No Model.) 9 Sheets—Sheet 4.
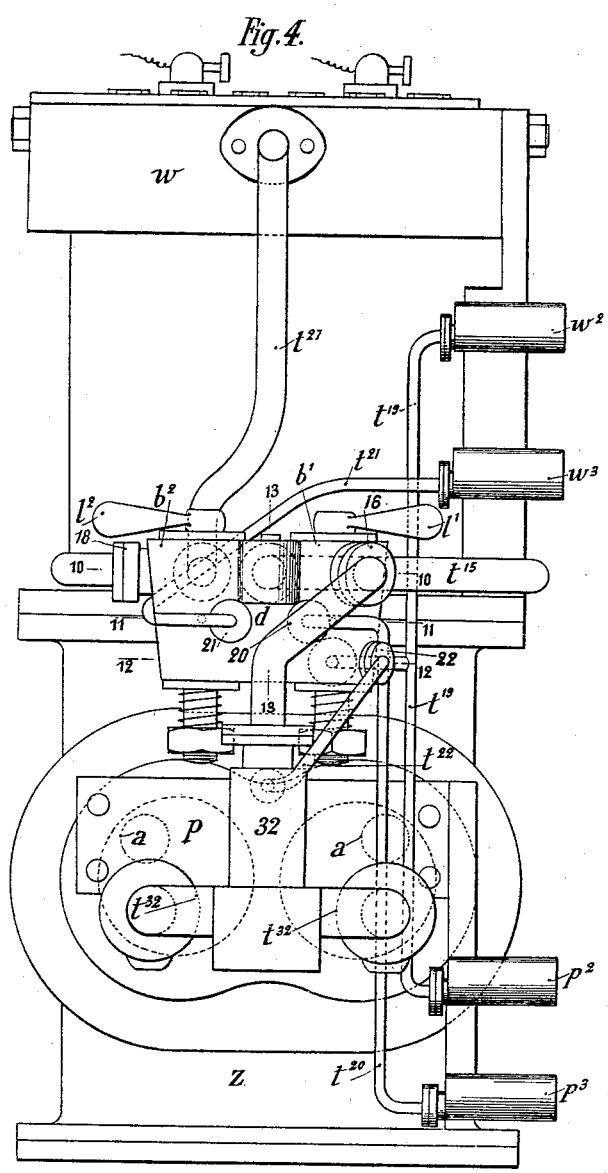
Fig. 4.
Witnesses
Inventor:
his Attorneys.

No. 625,416. Patented May 23, 1899.
L. L. REVEL.
CARBURETED AIR OR OTHER FLUID PRESSURE ENGINE.
(Application filed Aug. 18, 1898.)
(No Model.) 9 Sheets—Sheet 5.
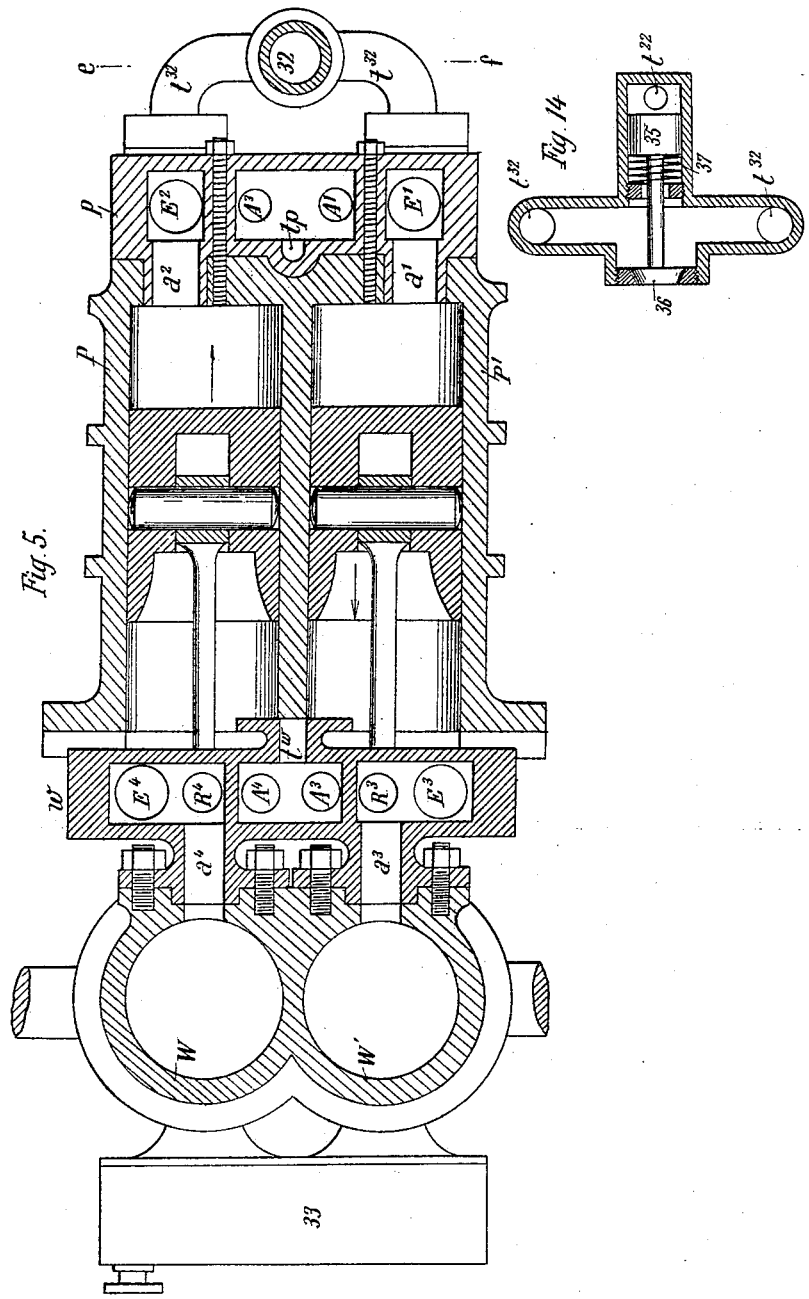
Witnesses:
Inventor:
Lievin Louis Revel
By Richardson
his Attorneys.

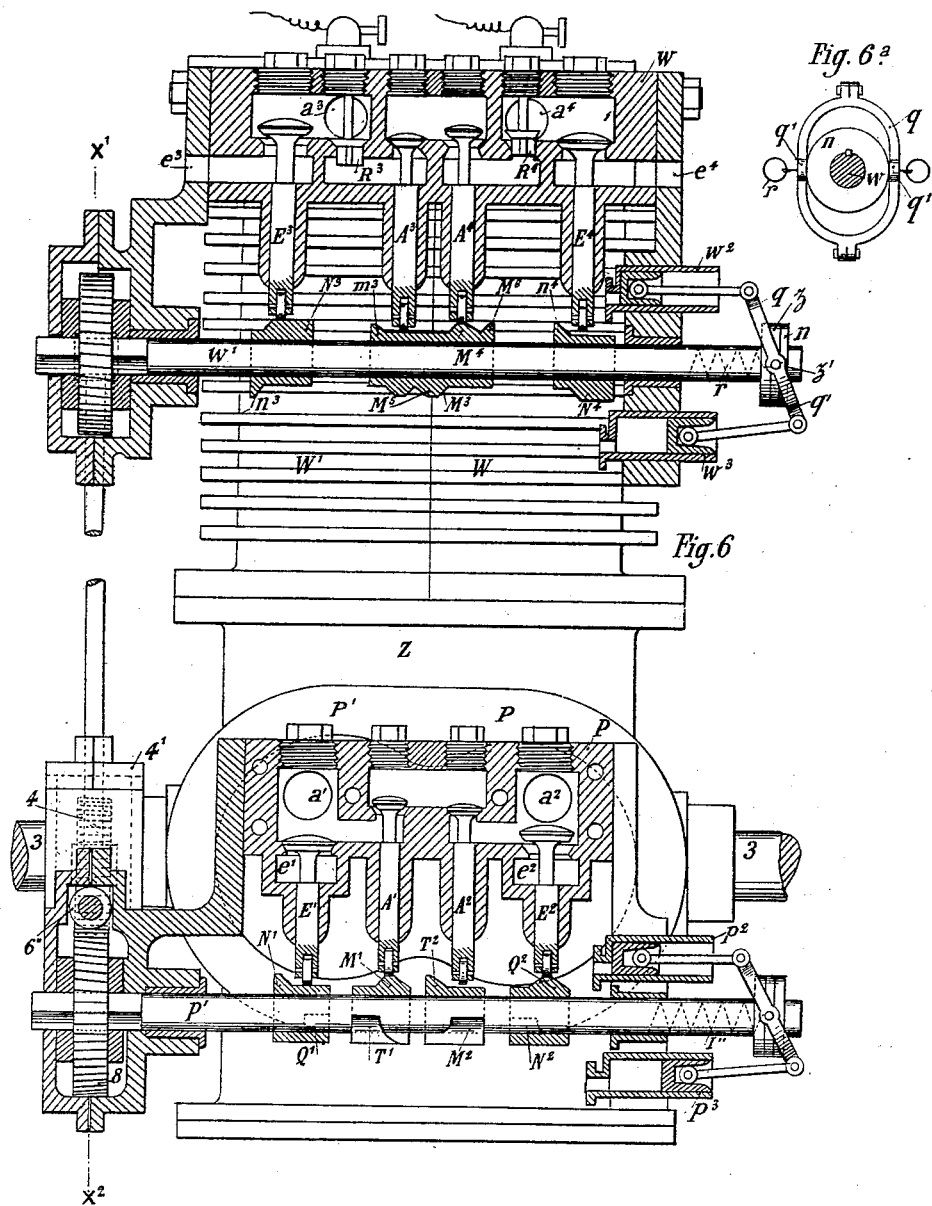

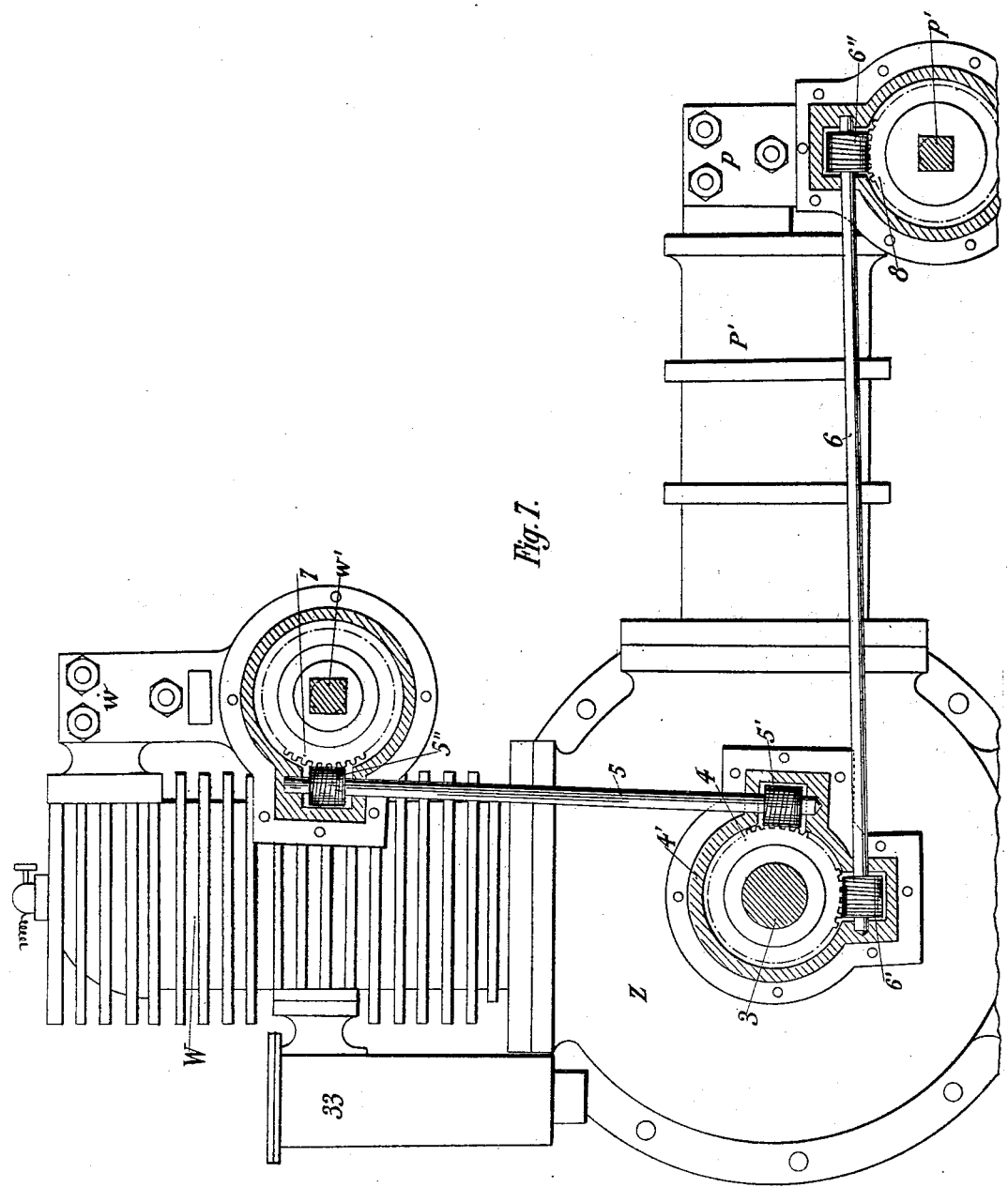

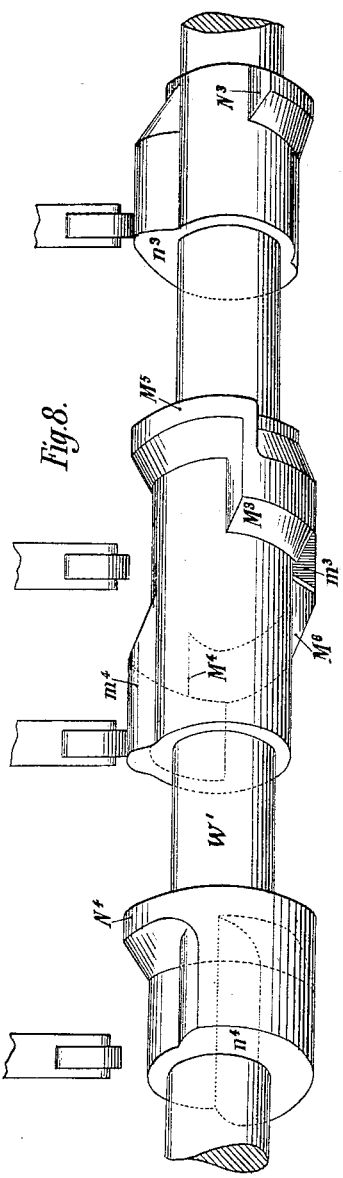

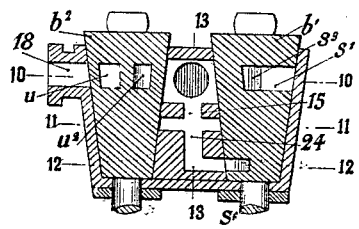

UNITED STATES PATENT OFFICE.

LIÉVIN LOUIS REVEL, OF HAVRE, FRANCE.

CARBURETED-AIR OR OTHER FLUID PRESSURE ENGINE.

SPECIFICATION forming part of Letters Patent No. 625,416, dated May 23, 1899.

Application filed August 18, 1898. Serial No. 688,945. (No model.)

*To all whom it may concern:*

Be it known that I, LIÉVIN LOUIS REVEL, a citizen of the French Republic, residing at Havre, (Seine-Inférieure,) France, have invented certain new and useful Improvements in and Relating to Carbureted-Air or other Fluid Pressure Motors; and I do hereby declare the following to be a full, clear, and exact description of the invention, such as will enable others skilled in the art to which it appertains to make and use the same.

The invention which forms the subject of the present application relates to a motor actuated by carbureted-air or any other fluid pressure and presents the following advantages: first, the possibility of varying, by means of the admission, the pressure of the explosive mixture at will, and consequently the power and speed of the motor; second, the possibility of starting the motor directly by the admission without the assistance of external appliances, such as levers or cranks, and that independently of the position of the organs which receive the motive fluid, the starting being either instantaneous or slowly increasing in speed, as desired; third, the possibility of reversing the engine directly by means of the admission appliances; fourth, marked reduction in the heating of the walls of the cylinders; fifth, possibility of performing all the operations required by means of a simple distributer. I obtain these advantages owing to the following improvements, which constitute the characteristic principles of my invention.

I employ four cylinders arranged in pairs in two planes at right angles to one another—for example, two horizontal cylinders and two vertical cylinders—the axes of the cylinders being at the intersections of two planes at right angles to one another, with the two planes parallel and normal to each of the preceding. The pistons of these cylinders are attached by their connecting-rods to cranks arranged at one hundred and eighty degrees with one another on the main shaft of the engine in such a way that one at least of the four pistons is always behind the dead-center. This arrangement has been employed in steam engines or motors—that is to say, motors receiving the actuating fluid at a pressure from a separate generator. The application of this arrangement to explosion-motors—that is to say, motors in which the pressure of the fluid is produced in the motor by the motor itself—is entirely novel. I have rendered it possible by combining the four cylinders with a reservoir or accumulator of air maintained constantly under pressure by the motor and capable of being brought into communication with each of the said cylinders at any moment by means of a distributer. The four cylinders may consequently be driven in this way by the compressed air from the accumulator, which enables the engine in any position to be started in either direction. Two of the cylinders are arranged for working normally with the carbureted air, (explosive mixture.) This air, always drawn from the accumulator and being under pressure which may be varied by means of the distributer, passes to the cylinders through a carbureter. The two other cylinders may work when desired as a starting-motor (in this case they take the air under pressure from the reservoir or accumulator) or as a single-acting pump when the motor is running normally for establishing and keeping up the pressure in the accumulator. The combination of four cylinders, placed in pairs at an angle of ninety degrees, with a regulating reservoir and accumulator capable of furnishing at any moment the fluid for actuating the four cylinders in the form of compressed air for permitting the starting in any position or direction, two of the cylinders receiving the fluid in the form of carbureted air and the two others, after having served as motors for starting, acting as pumps for producing the pressure in the accumulator, constitutes the novel principle characterizing my invention.

I have represented, as an example, in the accompanying drawings a four-cylinder motor producing two impulses per cycle constructed in accordance with these novel principles. In this example the two vertical cylinders may serve as cylinders for the carbureted air and as compressed-air cylinders for starting. The two horizontal cylinders will serve as air-motors for starting and as pumps or air-compressors during normal running.

Figure 2:
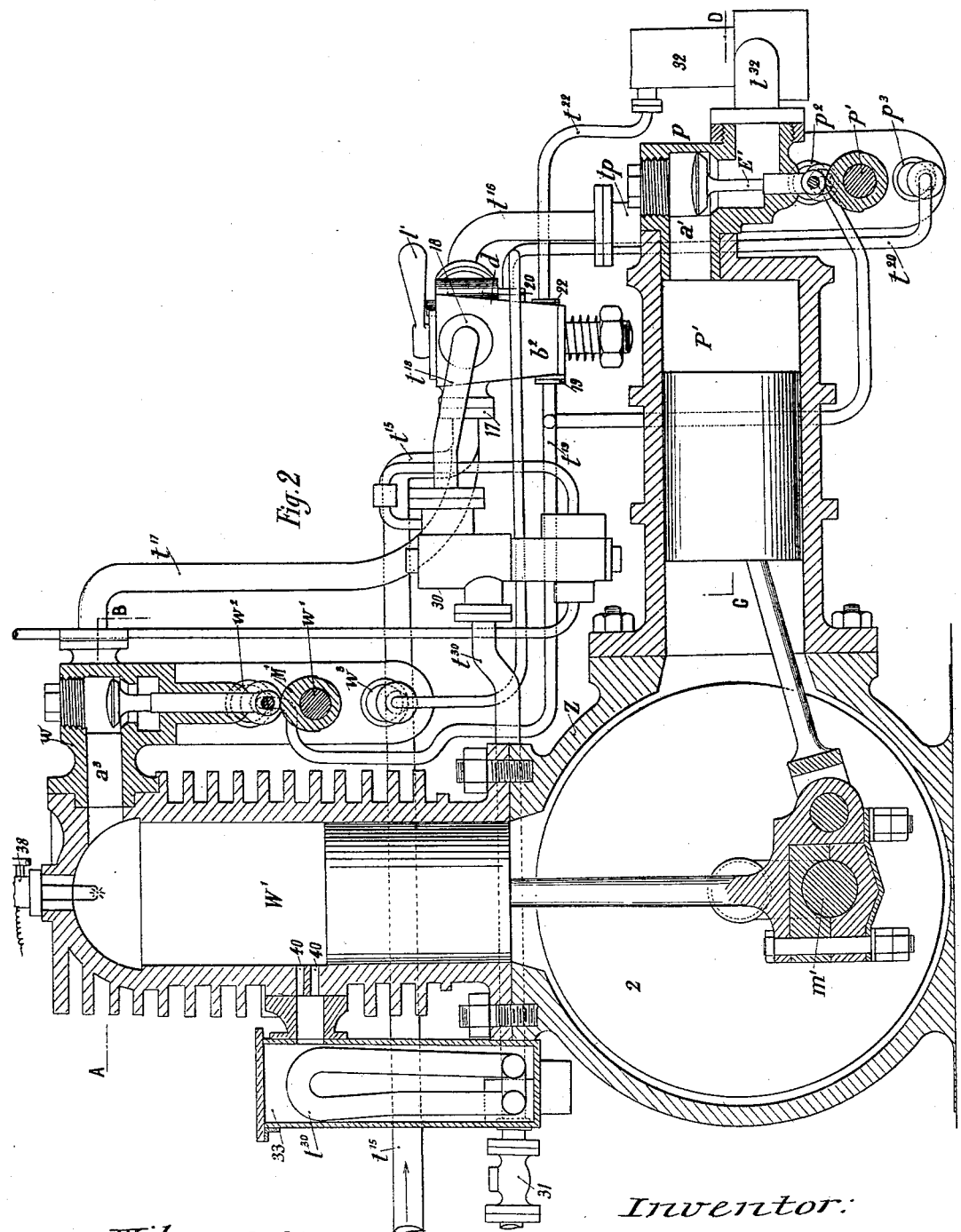
Figure 3:
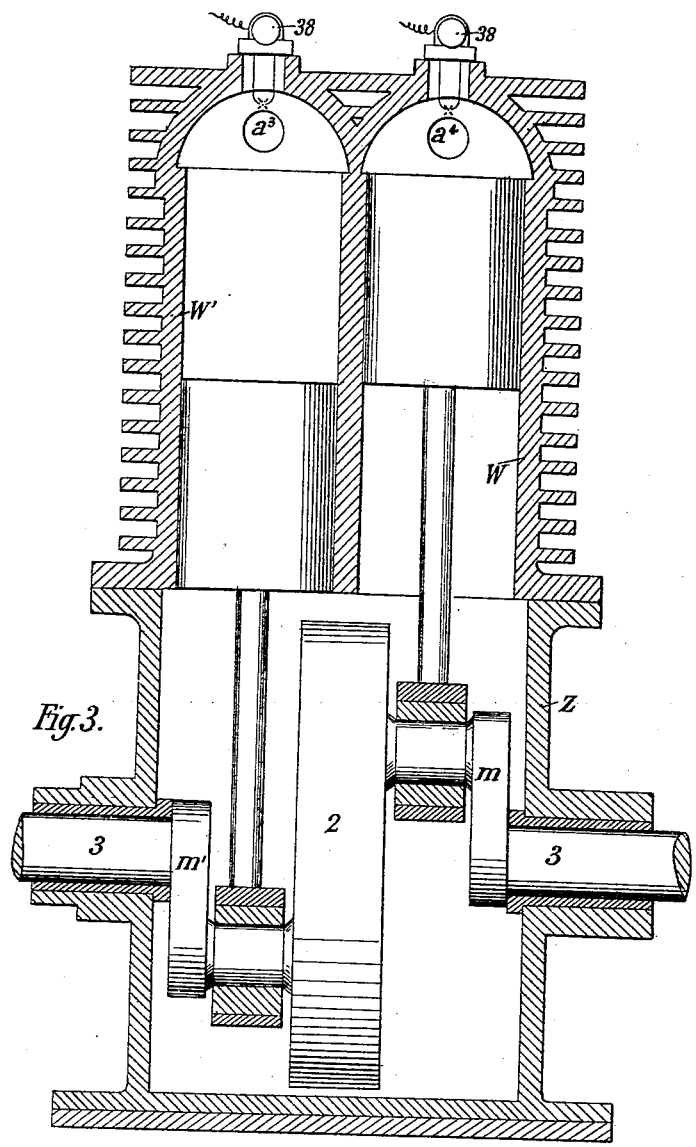

Figure 1 is a general plan of the motor connected by means of a suitable system of pipes with the accumulator or reservoir. Fig. 2 is a vertical section through M N of Fig. 1. Fig. 3 is a vertical section through I K of Fig. 1. Fig. 4 is a side elevation showing the distributer from the front. Fig. 5 is a horizontal section through A B C D of Fig. 2. Fig. 6 is a vertical section through E F G H of Fig. 1. Fig. 7 is an elevation and partial section through $X' X^2$ of Fig. 6, showing the arrangement for transmitting the movement from the main shaft of the motor to the special cam-shaft controlling the admission and exhaust valves of the cylinders. Fig. 8 is a perspective view of one of the cam-shafts above mentioned. Fig. 9 is a vertical section of the distributer through V V' of Fig. 1, the handles of the distributer being in the position corresponding to that in which the motor is at rest. Figs. 10 to 12 are horizontal sections of a distributer through the planes 10 10 11 11 12 12 of Figs. 4 and 9, the handles of the distributer being in the position corresponding to repose or stopping. Figs. $10^a$ to $12^a$ are similar sections, the handles of the distributer being in the position for reversing the motor. Figs. $10^b$ to $12^b$ are sections similar to the preceding, the handles being in the position for starting the motor. Figs. $10^c$ and $11^c$ are sections of the distributer, the handles being in the position for normal running. Fig. 13 is a vertical section of the distributer through $r s$ of Fig. 1 and 13 13 of Fig. 4. Fig. 14 is a vertical section through $e f$ of Fig. 5, showing the detail of the valve which closes automatically the communication between the horizontal cylinders and the atmosphere when these cylinders are acting as pumps and the required pressure is attained.

W W' are the two vertical cylinders of the same dimensions, open to the air at the lower ends and communicating at their top ends with the valve-box $w$.

P P' are the horizontal cylinders, open to the air at their front ends and communicating at the bottom of the valve-box $p$ at their farther ends.

The four cylinders are fixed or secured at their open ends to a frame forming a crank-chamber Z, in which move the cranks $m m'$, the crank-pins of which are fixed at an angle of one hundred and eighty degrees from one another in the fly-wheel or crank-disk 2, Figs. 2 and 3. Each of these crank-pins works in the "big" end of the connecting-rod common to a vertical cylinder and the horizontal cylinder the axis of which is situated in the same vertical plane with it, Fig. 2. The crank $m$ is consequently actuated by the big end common to the cylinders W and P. It follows that when one vertical piston is at the bottom of its stroke the corresponding horizontal piston is at half-stroke, and vice versa. The bearing of the crank-chamber may be fitted with brasses for the shaft 3—the main shaft of the motor—Fig. 3.

The admission and exhaust valves for the motor fluid, which are arranged, respectively, for the vertical and horizontal cylinders in the boxes or chambers $w p$, are controlled, respectively, by the cam-shaft $w'$ and $p'$ by any suitable mechanical contrivance—such, for example, as that shown in the drawings. A worm-wheel 4, working in a chamber 4' and keyed on the shaft 3, transmits movement to the worm 5', the shaft 5, and the worm 5'', on the one hand, and to the worm 6', the shaft 6, and the worm 6'', and so to the worm-wheels 7 and 8. These latter are fixed on the square end of the shafts $w' p'$ and maintained in their vertical position by cheeks, permitting the shafts $w' p'$ to be moved longitudinally during their rotation and so to bring the cams into the desired position successively for starting, normal running, reversing, and stopping. The longitudinal movements of the shafts $w' p'$ may be effected by any suitable mechanical arrangement connecting these shafts to the handles of the distributer. I prefer to employ the special arrangement which I have designed and which renders the distributer mechanically independent. I control the shafts by means of compressed air acting on little cylinders secured to the frame of the machine, the pistons of which are connected by movable mechanical arrangements to the shafts $w' p'$. These little cylinders are connected with the distributer by means of a system of tubes, the length and curvature of which will vary with the position which it is designed to give to the distributer.

To the shaft $w'$ correspond the little cylinders $w^2 w^3$, arranged, respectively, above and below the said shaft, Figs. 4 and 6. One of the ends of each of these cylinders is open to the air. The other is closed and carries a socket, to which is fixed the pipe connecting the cylinder to the distributer. The pistons which move in these little cylinders $w^2 w^3$ and which are exposed on one side by means of the distributer to the pressure of the compressed air from the accumulator 1 are connected on the opposite side to connecting-rods the far ends of which articulate with a ring $q$. This ring, Fig. $6^a$, carries on its horizontal axis two holes $q'$, which serve as bearings for the pivot $z'$ of the disk $z$ on the shaft $w'$. This disk is held between two disks $n n$ and keyed on the same shaft. Examination of the figure shows that the shaft $w'$ continues to rotate, while the pressure exercised on the pistons of the cylinders $w^2 w^3$ causes the longitudinal movements of the said shaft. Springs $r'$, of which one end is fixed to the ring $q$ and the other to some suitable point of the frame of the motor, Figs. 1 and 6, tend constantly to bring back the pistons to the ends of their respective cylinders.

The arrangement of the cylinders $p^2 p^3$, corresponding to the shaft $p'$, is exactly similar.

The chamber or valve-box $p$ of the two motor-cylinders and air-compressors P P' communicate, respectively, by the passages $a' a^2$ with each of these cylinders.

A' $A^2$, Fig. 6, are the admission-valves. E' $E^2$ are the exhaust-valves. To each of these valves corresponds a sleeve keyed on the shaft $p'$ and carrying two cams arranged at an angle of ninety degrees. One controls the opening of the valve for running forward and one for reversing.

$M'$ $M^2$ and $T'$ $T^2$ are the admission-cams. $Q'$ $Q^2$ $N'$ $N^2$ are the exhaust-cams for running forward and reversing, respectively. The exhaust-ports $e'$ $e^2$ communicate by means of two pipes $t^{32}$ with the box 32, into which runs the pipe $t^{22}$, coming from the passage 22 of the distributer $d$.

Valve-box $w$ of the two cylinders W W', which are capable of working with compressed atmospheric air or with compressed air carbureted through the passage in the carbureter 30, communicate, respectively, by means of the ports $a^3$ $a^4$ with each of these cylinders.

$A^3$ $A^4$ are the admission-valves for the air or explosive mixture.

$E^3$ $E^4$ are the exhaust-valves.

$R^3$ $R^4$ are the pressure-valves.

On the shaft $w'$ are keyed the cam-sleeves, with two cams for each of the admission-valves for compressed air $M^3$ $m^3$ $M^4$ $m^4$ for running forward and reversing and one cam for normal running with carbureted air $M^5$ $M^6$, and for each exhaust-valve two cams, respectively, for running forward and reversing $N^3$ $n^3$ $N^4$ $n^4$. As shown in Fig. 8, the cams run into the cylindrical portion of the sleeve in inclined planes, permitting the shaft to slide longitudinally without jarring taking place between the cams and the valve-rod. These cams instead of being joined on one sleeve may of course be keyed separately on the shaft $w'$. The box $w$ communicates with the atmosphere by the ports $e^3$ $e^4$.

R $R^4$ are the pressure-valves.

The distributer $d$ fulfils the following functions: First, it permits of the establishment or interruption of communication between the four cylinders W W' P P' of the motor and the accumulator 1 for admitting compressed air for starting or maintaining the pressure in the reservoir or accumulator by means of the cylinders P P' running normally; second, it enables communication to be made or interrupted between the cylinders W W' and the carbureter 30, Figs. 1 and 2, this latter receiving directly the compressed air from the reservoir 1; third, it permits communication to be established between the reservoir 1 and the four little cylinders $w^2$ $w^3$ $p^2$ $p^3$ or between these cylinders and the atmosphere. This distributer is a cock with two plugs $b'$ $b^2$ fitting into the same case or frame $d$ and separately movable by means of the handles $l'$ $l^2$. The body or frame $d$ is bored out, so as to constitute two orifices, which receive the plugs $b'$ $b^2$. Between them is a vertical passage 24, (shown clearly in Figs. 9 to 13,) connecting the horizontal passages on the different levels. The sections 10, 11, and 12 pass through the axes of these latter passages. The body $d$ has a number of external orifices, which I will proceed to enumerate.

In section 10 10 is a port 15, which by means of the passage 25 communicates with the vertical passage 24, with which communicates the pipe $t^{15}$, coming from the accumulator 1, a port 16 communicating internally with the seat of the plug $b'$ and externally with the pipe $t^{16}$, which runs into the valve-box $p$ of the horizontal cylinders, a port 17 ending internally in the seat of the plug $b^2$ and externally in the pipe $t^{17}$, which runs to the vertical-cylinder valve-box $w$, and, finally, port 18 ending internally in the seat of the plug $b^2$ and exteriorly in the tube $t^{18}$, which receives the compressed air charged with petrol-vapor from its passage through the carbureter 30.

In section 11 11 are two ports 20 and 21, ending, respectively, internally in the seats of the plugs $b'$ $b^2$ and externally in the tubes $t^{20}$ $t^{21}$. The tube $t^{20}$ passes into the little cylinder $p^3$. The tube $t^{21}$ passes into the cylinder $w^3$. Two passages or ports 23 23''' pass to the atmosphere externally and internally to the seats of the plugs $b'$ and $b^2$.

In section 12 12 are two ports 19 and 22, passing internally to the seat of the plug $b'$ and externally to the tubes $t^{19}$ $t^{22}$. The pipe $t^{19}$ passes by two branches at once to the little cylinder $w^2$ and the little cylinder $p^2$. The pipe $t^{22}$ ends in the box 32.

In the plug $b'$ are arranged a number of passages or conduits—three conduits $s'$ $s^2$ $s^3$ at one hundred and twenty degrees to each other in section 10 10, two conduits $s^4$ $s^5$, section 11 11, and one conduit $s^6$ and three other conduits or by-passes $s^7$ $s^8$ $s^9$ in the section 12 12.

In plug $b^2$ are arranged two passages $u'$ $u^2$ in the section 10 10 and a by-pass $u^3$ in the section 11 11. The passage 25 passes behind and under the seat of a valve 26, Figs. 10 and 13. A passage 27 connects it with the port 16.

I will proceed to explain the functions of the distributer and in what manner by simply actuating the handles $l'$ $l^2$ it is possible to start the engine by the action of the compressed air on one of the cylinders, no matter what may be the position of the crank, to obtain normal running subsequently with petrol in the two vertical cylinders, the two horizontal cylinders acting as air-compressors for maintaining the pressure in the accumulator, which has, it must be understood, in the first instance been charged by a hand-pump, to obtain variations in the speed and direction of the running.

Figs. 9 to 12 represent the distributer in the position of stopping, the handles $l'$ $l^2$ being arranged in the direction of the dotted lines in Fig. 10. It may be seen from Figs. 9 and 10 that the plug $b'$ intercepts all communication when in this position between the ports 15 and 16—that is to say, between the accumulator and the horizontal cylinders. The plug $b^2$ closes all communication between the ports 15 and 17, which shuts off the compressed air from the vertical cylinders. It also closes communication between the ports 17 and 18, preventing the entry of carbureted air to the said cylinders. It may be seen from Figs. 11 and 12 that the ports 20, 21, and 19 communicate, respectively, by the by-passes $s^4$, $u^3$, and $s^8$ with the apertures 23 23' 23'''—that is to say, puts into communication with the atmosphere the little cylinders $p^3$ $w^3$ $w^2$ $p^2$. The compressed air keeps the clack-valve 26, Figs. 10 and 13, on its seat. Finally, the port 22 communicating by the passage $s^6$ with the passages or ports 24 and 25, the air from the reservoir enters the box 32 over the piston 35 of the valve 36, balanced by the spring 37, the tension on which is regulated to correspond with the maximum pressure that it is desired to maintain in the accumulator. It is to be understood that the various parts being in this position the air-reservoir has been filled for the first time with compressed air by a pump. If the reservoir is properly air-tight, it will keep its charge for several days. For running the motor forward the handle $l'$ is turned to the right. At the same time the by-pass $s^4$ will be brought into such a position as to close all communication between 20 and 23 and establish communication between 20 and 24, the compressed air passing through the tube $t^{15}$ and the tube $t^{20}$ into the little cylinder $p^3$. The piston of this latter is thereby brought into the position shown in Fig. 6. The shaft $p'$ is moved longitudinally toward the right, and its cams $M'$ $M^2$ engage with the rods of the admission-valves $A'$ $A^2$. If the handle $l'$ is further turned so as to assume the position shown in Figs. $10^b$, $11^b$, and $12^b$, communication is established through the by-passes $s'$ $s^2$ with the ports 15 and 16, and so admission is given to the compressed air through the pipes $t^{15}$ and $t^{16}$ to the valve-box $p$. The horizontal cylinders then work as motors, the waste air escaping by the pipes $t^{32}$, the valve 36 being raised by the spring 37. In this position of the handle, Fig. $12^b$, the passage 22 communicates by means of the by-pass $s^9$ with the orifice 23'', which opens to the atmosphere, and the plug $b'$ closes all communication between the box 32 and the reservoir. The cams $M'$ $M^2$ being arranged for raising each of the admission-valves once per revolution and during three-fifths of the stroke of the piston, it may occur that in certain of the positions of the machine the valves $A'$ $A^2$ remain closed. Starting being then impossible by the horizontal cylinders it is necessary to admit the air to vertical cylinders. For this purpose the handle $l^2$ is turned to the left. Slight movement in this direction is sufficient to bring the plug $b^2$ in a certain position as to close communication between the port 21 and the orifice 23'', the said port, on the contrary, communicating by the channels 24 and 25 with the port 15. The compressed air then passes through the pipe $t^{15}$ and the above means of communication to the pipe $t^{21}$ and so to the little cylinder $w^3$, bringing the piston of this latter into the position shown in Fig. 6. The shaft $w'$ is moved longitudinally, thereby bringing its cams $M^3$ $M^4$ into a position for actuating the admission-valves $A^3$ $A^4$. At the same time, Figs. $10^b$ and $11^b$, the port 17 communicating by the passages $u^2$ and 25 with the port 15 the compressed air from the reservoir passes by way of the pipe $t^{15}$ and the pipe $t^{17}$ to the valve-box $w$, supplying the vertical cylinders. The cams $M^3$ $M^4$ which control the admission-valves $A^3$ $A^4$ being constructed to hold the valve raised during three-fifths of the stroke of the piston it follows that if in view of the position of the cranks $m$ $m'$ the starting cannot be effected by the horizontal cylinders it will be effected with certainty by the vertical cylinders and, as may be seen, by the direct admission of compressed air and by simply moving the handles of the distributer. The machine having been started the handle $l'$ is left in the position shown in Fig. $10^b$—that is, in the position for admitting the air to the horizontal cylinders—and the handle $l^2$ in the position of Fig. $10^c$—that is to say, it is turned to the right after having been brought into the stop position, Figs. 10 and 11, for allowing the air from the cylinder $w^3$ to escape into the atmosphere by the pipe $t^{21}$, the by-pass $u^3$, and the orifice 23'', Fig. 11. Communication is then established by the passage $u'$ between the ports 17 and 18, Fig. $10^c$. This permits the air (which coming from the reservoir 1 through the branch $t^{31}$ passes to the carbureter 30 through the spiral tube $t^{30}$, raising the valve 31 on its way and now forms an explosive mixture) to pass through the pipe $t^{18}$ and $t^{17}$ to the valve-box $w$ on the vertical cylinders. On the other hand, the shaft $w'$ having been brought by the springs $r'$ into its first position of rest (or stop position) the cams $M^5$ $M^6$ are brought into the same plane as the admission-valves. These cams are so arranged as only to lift the valves during one-tenth of the stroke of the piston of the corresponding cylinder and when the said piston is at the far end of its stroke. The vertical cylinders operate then in their normal manner by means of carbureted air. It may be seen at once that by means of the handle $l^2$ and by moving it toward the right beyond the position which it occupies in Fig. $10^c$ the passage of the explosive mixture is throttled to a greater or less extent, permitting the speed of the motor and the force of the explosions to be regulated by hand. It is evident that if the motor be run under a fixed load it will suffice for regulating the speed to throttle the gas in the pipe $t^{17}$ by means of any suitable regulator of known construction connected with a centrifugal governor. The explosive mixture which has entered the cylinder after lifting the valve $R^3$ or $R^4$ is ignited by means of any known system of ignition, such as an electric ignition. I have only shown in the drawings the sparking or igniting plugs 38. The spark occurs as soon as the corresponding piston comes to the dead-center. The gases explode, and when the piston has traveled to about seventy-five per cent. of its stroke the products of combustion escape immediately by the ports 40, Figs. 1 and 2, in the wall of the cylinder. They then pass to a box 33, which surrounds the twisted tube $t^{30}$, which conducts the compressed air to the carbureter. The heat of the exhaust-gases is thus utilized. On the other hand, as these gases are not compressed in the cylinder and do not remain there the walls of the latter are very slightly heated. In addition as soon as the ports 40 have been uncovered the corresponding exhaust-valve $E^3 E^4$ opens, allowing fresh air to enter the chamber by the passage $e^3$ or $e^4$, owing to the depression caused by the explosion. If a small quantity of hot gases remain behind the piston, these would pass off into the chamber, as the fresh air descending cools or bathes the back end of the piston. The piston (in its return stroke) drives out any of the products of the combustion which may remain, and at the end of its travel has behind it nothing but pure air, the exhaust-valve remaining open all the time. These advantages, which are the consequence of the novel mechanical arrangement which I have designed, form one of the novel technical results which my invention enables to be obtained. After the motor has been started and the vertical cylinders are running normally the handle $l'$ is brought back into the stop position. The little cylinder $p^3$ again communicates with the atmosphere, and the shaft $p'$, yielding to the action of the springs $r'$, liberates completely the rods of the valves $A' A^2 E' E^2$, which then operate exactly like the non-return suction-valves of a pump. The pistons of the cylinders P P' draw in air from the atmosphere and eject it again after compression by the port 16 and the passage 27. The valve 26 is raised and the air passes by the passage 25 and the pipe $t^{15}$ into the reservoir. The external air is only drawn in when the valve 36, Fig. 14, is raised—that is to say, when the pressure in the pipe $t^{22}$, and consequently in the reservoir with which that pipe communicates, is less than the pressure of the spring 37—that is to say, less than the pressure adjusted for. When, on the other hand, this pressure has been exceeded, the valve 36 closes and the pistons of the cylinders P P' work against a merely inappreciable resistance.

The stoppage of the motor is effected by bringing the handle $l^2$ into the stop position.

If it be desired to reverse the motor, it suffices to turn the two handles of the distributer to the left. When the plug $b'$ is turned toward the left, the by-pass $s^3$, which establishes communication between the port 19 and the opening 23', closes this communication and brings the said passage into communication by the passages 24 and 25 with the port 15. The compressed air coming from the reservoir 1 thus passes through the pipes $t^{15}$ and $t^{19}$, and so to the two small cylinders $w^2 p^2$, Fig. 12$^a$. At the same time the by-pass $s^5$ puts the passage 20 in communication with the port 15, and the compressed air coming from the reservoir is admitted by the pipe $t^{20}$ into the little cylinder $p^3$. Moving the plug $b^2$ to the left brings the by-pass $u^3$ in the position shown in Fig. 11$^a$. The air passes through the distributer to the passages 24 and 21 into the pipe $t^{21}$, and thence into the little cylinder $w^3$. Then when the two handles are turned to the left the compressed air is admitted into the four little cylinders $w^2 w^3 p^2 p^3$. The camshafts are thus driven to the end of their course and brought into the position in which they operate all the admission and exhaust valves for reversing the motor.

To sum up, it may be seen that by simply operating with handles $l' l^2$ of the distributer (which being only connected to the motor by a system of pipes can be placed wherever required) one may, as desired, first, introduce compressed air into the four cylinders W W' P P' and so produce a certain start, increasing in speed no matter what may be the position of the cranks, the position in which the motor runs depending upon the position given to the handles—that is to say, according to whether the compressed air is admitted to two of the small cylinders $w^2 w^3 p^2 p^3$ or to the four of them at once, which changes the position of the cam-shaft which controls the admission and exhaust valves; second, while the horizontal cylinders P P' are running with compressed air as motors the compressed carbureted air may be admitted to the cylinders W W' by turning the handle $l^2$; by means of which handle $l^2$ the admission may be more or less throttled and the compression and force of explosive charge varied; third, the normal running of the motor having once been established the cylinders P P' can be transformed by a simple turn of the handle $l'$ into pumps, which cease automatically to draw in air and to force it into the reservoir or accumulator when the pressure in this latter exceeds that for which it is regulated.

In the body of this specification it has been explained in what way the arrangement reduces the heating of the walls of the cylinders W W' to a minimum, rendering the employment of water cooling superfluous.

I claim—

1. An explosion engine or motor characterized by having four cylinders arranged with their axes in two planes which intersect at an angle of ninety degrees in such a way that the pistons to the said cylinders are connected to two cranks on the same shaft at one hundred and eighty degrees apart, in combination with inlet and exhaust valves for said cylinders means for operating the valves an accumulator or reservoir of compressed air capable of being put into communication by means of a distributer with two of the cylinders P, P', or with all the cylinders at once; the compressed air being thus distributed in the form of pure compressed air for starting no matter in what position or in the form of carbureted air or other fluid under pressure in the cylinders W, W' for normal running; while the cylinders P, P', serve at will as air compressors or motors the said distributer controlling the coöperative relation between the valves and their operating means substantially as described.

2. In combination, the two sets of cylinders W W' P P' connected with the crank-shaft by differently-set cranks, the valves for the two sets of cylinders, an air-reservoir connected with the valves, a carbureted-air supply connected with one set of cylinders W W', two cam-shafts $w'p'$ capable of receiving a double longitudinal movement while revolving to aline the cams with the proper valves for running with compressed air in either direction or for working the cylinders W W', with carbureted air, the said cylinders P P', being also connected to operate as air-compressing pumps.

3. In a gas-engine, the combination of the cylinder and piston, a series of valves controlling the supply of motive fluid thereto, the cam-shaft for controlling the operation of the valves and having longitudinal movement to vary the action of the valves, an air-reservoir, a pair of controlling-cylinders having their pistons connected to the cam-shaft to move the same longitudinally, and a distributer $d$ controlling the supply of air to the said controlling-cylinders to operate their pistons either separately or simultaneously.

LIÉVIN LOUIS REVEL.

Witnesses:
JOHN PRESTON BEECHER,
STEPHANE ALBERT CLOLVER.